United States Patent [19]

Sun

[11] 4,401,634
[45] Aug. 30, 1983

[54] TWO STEP PROCESS FOR THE PREPARATION OF ZEOLITE A BY HYDROTHERMAL TREATMENT OF CLINOPTILOLITE

[75] Inventor: Hsiang-ning Sun, Media, Pa.

[73] Assignee: Atlantic Richfield Company, Los Angeles, Calif.

[21] Appl. No.: 343,648

[22] Filed: Jan. 28, 1982

[51] Int. Cl.$^3$ ............................................. C01B 33/28
[52] U.S. Cl. ..................................... 423/118; 423/328; 423/329
[58] Field of Search ................ 423/118, 208, 328–330, 423/332; 252/455 Z

[56] References Cited

U.S. PATENT DOCUMENTS 3,733,390  5/1973  Robson ................................. 423/118
4,247,524  1/1981  Leonard ............................... 423/118
4,310,496  1/1982  Achenbach et al. ................ 423/118

FOREIGN PATENT DOCUMENTS 667751  7/1963  Canada ................................ 423/118

OTHER PUBLICATIONS

Robson et al., "Molecular Sieves—II", ACS Symposium Series 40, 1977, pp. 233–243.

Primary Examiner—Edward J. Meros
Attorney, Agent, or Firm—Delbert E. McCaslin

[57] ABSTRACT

A two step hydrothermal process for the preparation of zeolite A from clinoptilolite by (1) heat treating a mixture of clinoptilolite in an aqueous solution of sodium hydroxide and filtering the mixture followed by (2) reacting the filtrate with at least 75 percent of a stoichiometric amount of sodium aluminate to form and precipitate zeolite A from solution and recovering zeolite A.

12 Claims, No Drawings

TWO STEP PROCESS FOR THE PREPARATION OF ZEOLITE A BY HYDROTHERMAL TREATMENT OF CLINOPTILOLITE

BACKGROUND OF THE INVENTION

Zeolites or molecular sieves are three-dimensional crystalline alumina-silicates with internal pore structure having both cation exchange capacity and adsorption capacity. The cation exchange capacity of zeolites is related to the aluminum content and pore size, the aluminum atom carrying a unit negative charge in the crystalline framework and thus determining the cation exchange capacity. If the hydrated radius of a cation is too large for diffusion through the pores, then exchange capacity and rate for that cation will be low. The adsorption capacity of zeolites is related to the pore size and the size of the adsorbate molecule. Materials which can be diffused into the pores will be adsorbed while larger ones will not.

Zeolites may be synthesized from concentrated silica-alumina gels under basic conditions such as described in U.S. Pat. No. 2,882,243. According to U.S. Pat. No. 3,663,165, a zeolite molecular sieve catalyst has been synthesized from kaolin clay by calcining the kaolin at 1800° F. for 2 hours to form m-kaolin followed by two treatments with aqueous sodium hydroxide. The first treatment is carried out at 100° F. for 12 hours while the second is carried out at 180° F. for 12 hours.

U.S. Pat. No. 4,271,130 also describes a process for the preparation of Zeolite A from kaolin by converting the kaolin to meta-kaolin by flash heating at specific residence times and annealing in the presence of alkaline earth compounds, an uncolored halide or halogen and an alkali metal compound and reacting the meta-kaolin in an aqueous alkaline medium.

Certain zeolites do occur as mineral deposits in certain parts of the world. These mineral zeolites are usually found with varying amounts of other impurities and generally have low aluminum content. A particularly abundant mineral or natural zeolite is clinoptilolite having the formula $Na_x(AlO_2)_x(SiO_2)_y \cdot ZH_2O$ wherein $x=5$ to 7, $x/y=4.5$ to 5.5 and $z=1$ to 30.

According to a Russian article by A. Yu. Krupennikova, et al published by the P. G. Melikishvili Institute of Physical and Organic Chemistry of the Academy of Sciences of the Georgian S.S.R. and entitled Phase Transitions in the Recrystallization of Clinoptilolite, clinoptilolite has been subjected to caustic treatment to produce sodalite or phillipsite apparently in accordance with the equation:

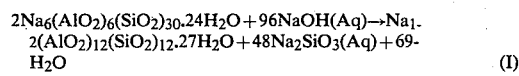

$$2Na_6(AlO_2)_6(SiO_2)_{30} \cdot 24H_2O + 96NaOH(Aq) \rightarrow Na_{12}(AlO_2)_{12}(SiO_2)_{12} \cdot 27H_2O + 48Na_2SiO_3(Aq) + 69H_2O \quad (I)$$

As is apparent, reaction (I) suffers from a dramatic weight loss and is more suitable for the production of $Na_2SiO_3$. In fact, each pound of clinoptilolite introduced into the process produces but 0.4 pounds of zeolite A and for each pound of zeolite A produced there is an accompanying 0.57 pound of water which must be vaporized in order to isolate zeolite A.

A process for the preparation of zeolite A by hydrothermal treatment of naturally occuring clinoptilolite in a slurry of sodium aluminate and aqueous sodium hydroxide is described in J. J. Leonard, U.S. Pat. No. 4,247,524. Due to the fact that natural clinoptilolite contains varying amounts of elemental impurities such as potassium, calcium, magnesium, iron and manganese which are either insoluble under such reaction conditions or are exchangable with the sodium form of the zeolite A product an undesirable off-white product having a low cation exchange capacity will usually result. In addition, control of the zeolite A particle size is difficult.

Clinoptilolite is one of the natural mineral zeolites of a group of hydrous alkali and/or alkaline earth aluminosilicates which have an open three-dimensional crystalline framework. The chemical and physical properties of clinoptilolite, as well as of zeolite A, is described in Breck, Zeolite Molecular Sieves (1974) and other publications. The geologic occurence of natural mineral zeolites and some industrial and agricultural uses of zeolites in general are given. Zeolites including the zeolite A prepared by the instant process may be employed in various catalyst systems.

It is a principal object of this invention to provide an improved process which produces zeolite A from clinoptilolite in high yield and of superior quality including color and particle size distribution.

SUMMARY OF THE INVENTION

The present invention relates to an improved method for the preparation of a high quality zeolite A of the sodium (Na) cation form which has the general formula $Na_x(AlO_2)_x(Si)_2)_y \cdot ZH_2O$ wherein $x=10$ to 14, $y/x=0.8$ to 1.2 and $Z=1$ to 30 which comprises a two step hydrothermal treatment of natural clinoptilolite having the general formula $Na_x(AlO_2)_x(SiO_2)_y \cdot ZH_2O$ wherein $x=5$ to 7, $y/x=4.5$ to 5.5 and $Z=1$ to 30. In the first step, the clinoptilolite is heat treated in an aqueous solution of sodium hydroxide. The clinoptilolite-sodium hydroxide mixture is then filtered and the filtrate reacted with at least 75 percent of a stoichiometric amount of sodium aluminate ($NaAlO_2$ or $Na_2Al_2O_4$) in water to form zeolite A which precipitates out of the solution.

DETAILED DESCRIPTION OF THE INVENTION

In accordance with the present invention a sodium cation form of zeolite A is prepared from natural clinoptilolite by a novel two step hydrothermal process which comprises (1) heating the natural clinoptilolite in an aqueous sodium hydroxide solution for a period of time to dissolve clinoptilolite and filtering to remove undissolved material, including undissolved clinoptilolite and, elemental impurities, and form a filtrate which is (2) reacted by heating with at least 75 percent of a stoichiometric amount of sodium aluminate in aqueous solution for a period of time to precipitate and form zeolite A which may be recovered by filtration of the mixture followed by water wash and drying.

The temperature of heating the clinoptilolite-sodium hydroxide solution as well as the filtrate-sodium aluminate solution may range from about 60° C. to 110° C. and is preferably from 90° C. to 100° C. Both reactions may also be carried out at temperatures from 110° to about 150° C. under pressure. The time of heating in both steps will be dependent on the choice of temperature and the ratio of reactants. Generally the time will range from 15 minutes to 4 hours and preferred conditions involved a time of from 15 minutes to 1 hour.

In the first heating step the sodium hydroxide concentration in water ranges from about 1 percent to 30 percent, preferably 10 percent to 20 percent by weight with the concentration of clinoptilolite being at least one gram of clinoptilolite per 100 cc of sodium hydroxide solution. The upper limit of clinoptilolite present in the sodium hydroxide solution is not critical. However, the amount present should not be such as to afford an unworkable viscosity or prevent reasonable dissolution of the clinoptilolite. Generally the clinoptilolite concentration in aqueous sodium hydroxide will range from 4 to 16 grams of clinoptilolite per 100 cc of sodium hydroxide solution. The clinoptilolite-sodium hydroxide hydrothermal treated solution is centrifuged or filtered by any conventional means at reaction temperature or less (room temperature) to remove undissolved material and produce a filtrate to be reacted with aqueous sodium aluminate.

In the second heating step the filtrate from the first step, as may be determined by the silica-alumina ratio thereof, is reacted with at least 75 percent of a stoichiometric quantity preferably a stoichiometic amount of sodium aluminate in aqueous solution, for zeolite A formation. Less than 75 percent of the stoichiometric amount of sodium aluminate will not give a good yield of zeolite A. The Si:Al ratio of the filtrate as determined by atomic absorption will be between a 1:1 Si:Al ratio (zeolite A) and a 5:1 Si:Al ratio (clinoptilolite). In general the filtrate will have a 3.5:1 Si:Al content. The amount of sodium aluminate present in aqueous solution may range between about 1 and 16.5 percent (an approximate saturated solution) by weight and is preferably from 4 to 15 percent by weight.

It has also been determined that sodium chloride in amounts of from 0 to 15 weight percent, based on the aqueous NaOH solution or the aqueous sodium aluminate solution may optionally be added during the first and/or second hydrothermal treatment step to increase the rate of reaction in preparing the zeolite A in Step 2 and thus, allow the employment of smaller reactors. Addition of the NaCl will generally give small quantities of sodalite in the product. In addition, 0 to 30 percent sodium hydroxide, based on the aqueous sodium aluminate solution, may be added in the second step to increase the aqueous sodium aluminate solubility rate and to maintain an NaOH concentration with a desired range to provide for recycle, after forming and recovery of zeolite A, of the aqueous solution to the first stage hydrothermal treatment with the addition of fresh clinoptilolite.

Once zeolite A has been formed which may be determined by X-ray diffraction studies, the precipitated zeolite A may be recovered by means such as filtration. Subsequently, the zeolite A may be water washed and then dried. Drying may be carried out at room temperature or at elevated temperatures. The zeolite A produced by the instant process is in a white crystalline form. It has a good cation exchange capacity and a mean particle size in the 3 to 6 micron range.

The following examples which include comparative examples to illustrate the invention in accordance with the principles of this invention but are not to be considered as limiting the invention in any way except as indicated by the appended claims.

EXAMPLE 1 (Comparative)

(Example 12 of U.S. Pat. No. 4,247,524)

A 10 weight percent NaOH and 8.2 weight percent NaAl(OH)$_4$ solution was prepared by dissolving 100 g. of NaOH and 82 g. of NaAl(OH)$_4$ in 818 g. of water. 300 cc of this solution was charged into a 500 cc round bottom flask equipped with a mechanical stirrer. 24.0 g. of clinoptilolite was added and the flask was heated in an oil bath at 80° C. for 4 hours. The hot slurry was then filtered to give 40.6 g. of zeolite A upon air drying at 25° C. The product was identified by X-ray diffraction and elemental analysis. The color is off-white. It has a calcium exchange capacity of 5.26 meq per gram of anhydrous zeolite A. Its means particle size is 17 microns.

EXAMPLE 2 (Comparative)

(Example 5 of U.S. Pat. No. 4,247,524)

The above example was repeated at 95° C. for 2 hours to give 44.2 g. of zeolite A after filtration and air drying at 25° C. The product is off-white. Its calcium exchange capacity was 4.81 meq per gram of anhydrous zeolite. Mean particle size of this product was 16 microns.

EXAMPLE 3

(Step 1) A solution of 10 percent by weight of NaOH was prepared by dissolving 100 g. of NaOH in 900 g. of water. 400 cc of this solution was introduced into a 500 cc round bottom flask equipped with a mechanical stirrer and a thermometer. 8.0 g. of clinoptilolite was added and the mixture heated in an oil bath at 95° C. for 1 hour. The hot mixture was then filtered to leave 2.17 g. of residue upon air drying at 25° C.

(Step 2) 350 cc of the hot filtrate from step 1 was recharged into the reactor, and 45 cc of 15 weight percent NaAl(OH)$_4$ in water was added. A precipitate is formed immediately. The mixture was heated at 95° C. for two hours. 10.9 g. of zeolite A product was recovered by filtration of the hot mixture followed by water wash and air drying at 25° C. X-ray diffraction and elemental analysis showed the product was zeolite A. The product was white. It has a cation exchange capacity of 6.08 meq Ca$^{++}$ per gram of anhydrous zeolite. It has a mean particle size of 4.5 microns.

EXAMPLE 4

(Step 1) A solution was prepared by dissolving 100 g. of sodium hydroxide and 1 g. of sodium chloride in 899 g. of water to give 10 weight percent sodium hydroxide and 1.0 weight percent of sodium chloride. 500 cc of this solution was introduced into a 1 liter round bottom flask as described in Example 3. 20 g. of clinoptilolite were added to this solution and the flask was heated in an oil bath at 95° C. for 4 hours. The hot mixture was then filtered to give 9.8 g. of the residue.

(Step 2) 400 cc of the hot filtrate solution from Step 1 was recharged into the reactor and 90 cc of 10 percent NaOH, 15 percent NaAl(OH)$_4$ aqueous solution added to form a white precipitate immediately. The mixture was stirred in an oil bath at 95° C. for 1 hour. 16.5 g. of pure zeolite A was recovered by filtration of the hot mixture followed by water wash and air drying at 25° C. The product was identified by x-ray diffraction and elemental analysis. It has a cation exchange capacity of 6.10 meq Ca$^{++}$ per gram of anhydrous zeolite. The mean particle size was 5 microns.

EXAMPLE 5

(Step 1) An aqueous dispersion of 20 percent by weight NaOH was prepared by dissolving 200 g. of NaOH in 800 g. of water. 400 cc of this solution was introduced into a 500 cc round bottom flask equipped with a mechanical stirrer and a thermometer. 20 g. of clinoptilolite was added and the mixture heated in an oil bath at 95° C. for 1 hour. The hot mixture was filtered to leave 4.51 g. of residue upon air drying at 25° C.

(Step 2) 350 cc of the hot filtrate from Step 1 was recharged to the reactor, and 110 cc of a 15 weight percent NaAl(OH)$_4$ in water was added. A precipitate formed immediately. The mixture was heated at 95° C. for two hours. 22.5 g. of zeolite A product was recovered by filtration of the hot mixture followed by water wash and air drying at 25° C. X-ray diffraction and elemental analysis showed the product to be zeolite A. The zeolite A product was white and had a cation exchange capacity of 6.09 meq Ca$^{++}$ per gram of anhydrous zeolite. It had a mean particle size of 4.9 microns.

EXAMPLES 6 TO 24

In Examples 6 to 24 which follow in Table form, the procedure of Step 1 of Example 5 was repeated employing varying amounts of sodium hydroxide and clinoptilolite (clino) together with varying time and temperature conditions. The conditions, reactants and percent solubility of clinoptilolite is set forth in Table 1.

TABLE 1

| Ex. No. | % NaOH | Clino g/cc of NaOH solu. | Time (min.) | Temp. (°C.) | Solubility of Clino (%) |
|---|---|---|---|---|---|
| 6 | 30 | 0.125 | 60 | 90 | 56 |
| 7 | 30 | 0.05 | 60 | 95 | 79 |
| 8 | 25 | 0.125 | 60 | 95 | 60 |
| 9 | 25 | 0.10 | 15 | 95 | 44 |
| 10 | 25 | 0.10 | 60 | 95 | 72 |
| 11 | 25 | 0.08 | 60 | 95 | 74 |
| 12 | 25 | 0.05 | 45 | 90 | 80 |
| 13 | 20 | 0.05 | 30 | 75 | 45 |
| 14[a] | 20 | 0.05 | 45 | 95 | 69 |
| 15[a] | 20 | 0.05 | 60 | 95 | 82 |
| 16 | 17.5 | 0.08 | 45 | 95 | 74 |
| 17 | 17.5 | 0.062 | 45 | 95 | 74 |
| 18 | 17.5 | 0.05 | 30 | 90 | 68 |
| 19 | 17.5 | 0.05 | 60 | 90 | 80 |
| 20 | 16.5 | 0.05 | 60 | 95 | 81 |
| 21 | 15 | 0.05 | 30 | 70 | 43 |
| 22 | 15 | 0.05 | 60 | 95 | 70 |
| 23 | 12.5 | 0.05 | 30 | 95 | 58 |
| 24 | 12.5 | 0.05 | 60 | 95 | 62 |

[a]with 2 percent NaCl based on the aqueous NaOH solution.

EXAMPLES 25 TO 33

In Examples 25 to 33 which follow in Table form the procedure of Step 2 of Example 5 was repeated employing the filtrates of Examples 9, 10, 11, 12, 14, 17, 22, 12 and 15 respectively with a stoichiometric amount of sodium aluminate as an aqueous solution. Varying amounts of sodium hydroxide was added to the sodium aluminate solution. 2 percent NaCl was added with the NaOH solution of Example 33. The results are set forth in Table 2. The product was determined by X-ray diffraction and elemental analysis.

TABLE 2

| Ex. No. | % NaOH | Temp. (°C.) | Time (min.) | Product[b] |
|---|---|---|---|---|
| 25 | 20 | 95 | 30 | A |
| 26 | 25 | 95 | 15 | A + trace M |
| 27 | 25 | 95 | 30 | A + trace M |
| 28 | 25 | 80 | 30 | A + trace S |
| 29 | 25 | 70 | 45 | A + trace S |
| 30 | 17.5 | 95 | 20 | A |
| 31 | 15 | 95 | 45 | A |

TABLE 2-continued

| Ex. No. | % NaOH | Temp. (°C.) | Time (min.) | Product[b] |
|---|---|---|---|---|
| 32 | 0 | 95 | 90 | A |
| 33 | 20[a] | 95 | 5 | A |

[a]contains 2 percent NaCl
[b]A = Zeolite A;
M = Amorphous aluminosilicate
S = Sodalite

I claim:
1. A hydrothermal process for the preparation of a sodium cation form of zeolite A from natural clinoptilolite of the formula

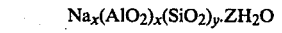

$$Na_x(AlO_2)_x(SiO_2)_y \cdot ZH_2O$$

wherein x=5 to 7, y/x=4.5 to 5.5 and z=1 to 30 which comprises the steps of:
  (a) heating at a temperature of from about 60° C. to 110° C. said natural clinoptilolite in a 1 to 30 weight percent aqueous solution of sodium hydroxide to dissolve clinoptilolite, the clinoptilolite having a concentration of at least one gram clinoptilolite per 100 cc of aqueous sodium hydroxide solution;
  (b) filtering the clinoptilolite-sodium hydroxide solution to remove undissolved clinoptilolite and elemental impurities and form a filtrate;
  (c) reacting the filtrate at a temperature of from about 60° C. to 110° C. in the presence of up to 15 weight percent NaCl with at least 75 percent of a stoichiometric amount of sodium aluminate in an aqueous solution to precipitate and form zeolite A having a mean particle size of about 3 to 6 microns, said sodium aluminate having a concentration of from 1 to 16.5 weight percent in water; and recovering said zeolite A.

2. A process according to claim 1 wherein the aqueous sodium hydroxide solution is in the range of from 10 to 20 percent by weight.

3. A process according to claim 1 wherein the concentration of clinoptilolite is from 4 to 15 g. per 100 cc of aqueous sodium hydroxide solution.

4. A process according to claim 1 wherein the temperature of heating in step (a) and reacting the filtrate in step (c) is from 90° to 100° C.

5. A process according to claim 1 wherein the heating in step (a) and reacting the filtrate in step (c) are carried out at a temperature of from 110° C. to 150° C. under pressure.

6. The process according to claim 1 wherein the heating in step (a) and reacting the filtrate in step (c) are carried out for from 15 minutes to 4 hours.

7. The process of claim 6 wherein the time is from 15 minutes to 1 hour.

8. A process according to claim 1 wherein a stoichiometric amount of sodium aluminate in aqueous solution is employed.

9. A process according to claim 1 wherein said sodium aluminate concentration in water is from 4 to 15 percent by weight.

10. A process according to claim 1 wherein the NaCl based on the aqueous sodium hydroxide solution is added in step (a).

11. A process according to claim 1 wherein the NaCl based on the sodium aluminate aqueous solution is added in step (c).

12. A process according to claim 1 wherein from 0 to 30 weight percent sodium hydroxide based on the aqueous sodium aluminate solution is added in step (c).

* * * * *